United States Patent [19]

Ishizaki

[11] Patent Number: 5,701,065
[45] Date of Patent: Dec. 23, 1997

[54] METHOD AND APPARATUS FOR CONTROLLING SYNCHRONOUS MOTOR

[76] Inventor: Akira Ishizaki, No. 22-5, Nagatakita 3-chome, Minami-ku, Yokohama-shi, Kanagawa, Japan

[21] Appl. No.: 584,176

[22] Filed: Jan. 11, 1996

Related U.S. Application Data

[63] Continuation-in-part of Ser. No. 336,238, Nov. 7, 1994, abandoned.

[30] Foreign Application Priority Data

Nov. 18, 1993 [JP] Japan ................... 5-288863

[51] Int. Cl.$^6$ ........................................ H02P 1/46
[52] U.S. Cl. ................... 318/701; 318/254; 318/705; 318/712
[58] Field of Search ................. 318/254, 700–724

[56] References Cited

U.S. PATENT DOCUMENTS

| | | | |
|---|---|---|---|
| 3,696,277 | 10/1972 | Liska et al. | 318/138 |
| 4,344,023 | 8/1982 | Yokobori et al. | 318/254 |
| 4,678,973 | 7/1987 | Elliott et al. | 318/254 |
| 4,712,050 | 12/1987 | Nagasawa et al. | 318/254 |
| 5,006,768 | 4/1991 | Rozman | 318/254 |
| 5,155,419 | 10/1992 | Naito | 318/254 |
| 5,481,166 | 1/1996 | Moreira | 318/254 |
| 5,486,743 | 1/1996 | Nagai | 318/254 |

*Primary Examiner*—David S. Martin
*Attorney, Agent, or Firm*—Wenderoth, Lind & Ponack

[57] ABSTRACT

In a novel method and apparatus for controlling a synchronous motor, an angular position transducer, in whose output winding three-phase voltages with amplitude variations of N (N: an integer of 1 or more) cycles per revolution is induced, is directly coupled to a synchronous motor with 2N poles so that the demodulated a-phase voltage of the transducer has its positive peak value multiplied by the cosine of a selected angle as MMF phase angle when a direct axis of the motor is located in the position of its a-phase winding axis. The instructions to control three-phase currents of an inverter feeding the motor are produced by multiplying the current phase instructions by the amplitude instruction. The former is directly obtained using the three-phase voltages demodulated from the output of the transducer and the latter is derived from the detected speed deviation or torque instruction. A changeover device is used for the current phase instruction to produce the reverse torque necessary in the four-quadrant drive of synchronous reluctance motors and interior permanent magnet synchronous motors. Although the latter is the same as the conventional method, the former simplifies the apparatus because of analog processing not using expensive R/D converters. Therefore, the present invention is effective to reduce costs and to increase reliability of the control apparatus synchronous motors.

30 Claims, 10 Drawing Sheets

5,701,065

METHOD AND APPARATUS FOR CONTROLLING SYNCHRONOUS MOTOR

CROSS-REFERENCE TO RELATED APPLICATIONS

This application is a continuation-in-part of now abandoned application Ser. No. 08/336,238, filed in the U.S. Patent and Trademark Office on Nov. 7, 1994.

BACKGROUND OF THE INVENTION

The present invention relates to methods and apparatus for controlling synchronous reluctance motors, permanent magnet synchronous motors and field winding type synchronous motors which are widely used in the industrial field by virtue of their high efficiency as compared with induction motors. The methods and apparatus utilize the demodulated three-phase voltages of a rotor position transducer directly coupled to the motor. The term synchronous motor has been used in the title and general descriptions in the specification for the aforementioned types of synchronous motors for simplicity, in that they are considered to be in the same category with respect to their drive behavior.

Although it is possible to control the speed of synchronous motors by an open loop frequency control while keeping the ratio of voltage to frequency constant, a so-called vector control is effected when a fast torque or speed response is needed, and in such a case, a rotor position sensor, such as a rotary encoder or resolver, is generally used.

Incremental type rotary encoders are widely used and have a weakness in that it is necessary to generate a pulse showing a zero position by moving the rotor whenever the encoder is first used. On the other hand, absolute type encoders are free from such a weakness but are very expensive. Moreover, the use of optical rotary encoders in a dirty environment results in problems.

Resolvers have no problem when used in a dirty environment and can give an absolute position by processing their signals through a resolver/digital (abbreviated R/D) converter. However, the total cost including the R/D converter becomes very high.

Although vector control without such position sensors is being developed, it is not yet widely used in practical applications.

Accordingly, the object of the present invention is to provide a novel technique for controlling synchronous motors that makes it possible to simplify control apparatus including a synchro/resolver and to realize a low cost and a high reliability by not using an R/D converter.

The object may be effected by providing an apparatus for controlling a synchronous motor having 2N poles, where N is an integer greater than or equal to one, comprising: an angular position transducer in whose output windings three-phase voltages with amplitude variations of N cycles per revolution are induced, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis; an inverter for outputting three-phase currents for feeding the motor; a demodulator for demodulating the three-phase output voltages of the angular position transducer; a speed detector for determining an actual speed from the demodulated output of the demodulator and for determining a speed deviation which is the difference between the actual speed and a target speed; a PI controller for providing a current proportional to the speed deviation; and three multipliers for respectively multiplying the voltage output by the PI controller by the three-phase output voltages of the demodulator for generating three-phase current instructions for inputting to a current control circuit of the inverter.

The object may also be effected by providing an apparatus for controlling a synchronous motor having 2N poles, where N is an integer greater than or equal to one, comprising: an angular position transducer in whose output windings two of three-phase voltages with amplitude variations of N cycles per revolution are induced, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis; an inverter for outputting three-phase currents for feeding the motor;
  a demodulator for demodulating the two of three-phase output voltages of the angular position transducer; a speed detector for determining an actual speed from the demodulated output of the demodulator and for determining a speed deviation which is the difference between the actual speed and a target speed; a PI controller for providing a current amplitude instruction based on the speed deviation; two multipliers for respectively multiplying the voltage output by the PI controller by the two of three-phase output voltages of the demodulator for generating two of three-phase currents for inputting to the inverter; and an adder for adding the outputs of the two multipliers to generate a third of the three-phase currents for inputting to a current control circuit of the inverter.

Furthermore, the object may be effected by providing a method of controlling a synchronous motor having 2N poles, where N is an integer greater than or equal to one, comprising: inducing three-phase voltages with amplitude variations of N cycles per revolution in output windings of an angular position transducer, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis; outputting three-phase currents for feeding the motor from an inverter; demodulating the three-phase output voltages of the angular position transducer with a demodulator; determining an actual speed from the demodulated output of the demodulator and determining a speed deviation which is the difference between the actual speed and a target speed with a speed detector; providing a current amplitude instruction based on the speed deviation with a PI controller; and respectively multiplying the voltage output by the PI controller by the three-phase output voltage of the demodulator and generating three-phase current instructions for inputting to a current control circuit of the inverter using three multipliers.

Still furthermore, the object may be effected by providing a method of controlling a synchronous motor having 2N poles, where N is an integer greater than or equal to one, comprising: inducing three-phase voltages with amplitude variations of N cycles per revolution in two of three output windings of an angular position transducer, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis; outputting three-phase currents for feeding the motor from an inverter; demodulating the two of three-phase output voltages of the angular position transducer with a demodulator; determining an actual speed from the demodulated output of the demodulator and for determining a speed deviation which is the difference between the actual speed and a target speed with a speed detector; providing a current amplitude instruction based on the speed deviation with a PI controller; respectively multiplying the voltage output by the PI controller by the two of three-phase output voltage of the demodulator and generating two of three-phase current instruction for inputting to a current control circuit of the inverter using two multipliers; and adding the outputs of the two multipliers to generate a third of the three-phase currents for inputting to a current control circuit of the inverter using an adder.

So far, speed control scheme based on a speed instruction were explained. However, a torque control scheme is also easily possible by providing a current amplitude instruction signal based on a torque instruction instead of the PI controller.

SUMMARY OF THE INVENTION

Although there are a variety of schemes in the vector control of synchronous motors, the present invention is related to a novel technique for improving the prior art method whose block diagram is shown in FIG. 11. A detailed explanation thereof was presented in the paper entitled "Variable Speed Drive System of Interior PM Motor by MMF Phase Angle Constant Control", Proceedings of 1990 International Power Electronics Conference, p. 964. In this prior art, the inverter currents feeding the motor are controlled according to the current instruction determined by multiplying the following two instructions:

- a phase current instruction is determined so that an electrical space angle between a peak position of a magnetomotive force (abbreviated MMF) and a center of a rotor pole, direct axis, as detected by a position sensor, which is called the MMF phase angle, is kept at an instruction value;
- an amplitude current instruction is generated by a PI controller based on a detected speed deviation.

The current phase instructions have been produced by digitally processing the MMF phase angle instruction and a digital value corresponding to the position of the pole center output through an interface from the sensor, and then converted to an analog value by a digital/analog (D/A) converter in the conventional method.

In the present invention, this procedure is effectively simplified by not using digital processing but by rather using analog processing. At first, the speed control of a synchronous reluctance motor using a multi-speed synchro as the position transducer is described. Since "multi" in the multi-speed synchro means concretely an integer N, an N-speed synchro is abbreviated NX-synchro in the specification for simplicity. The NX-synchro is a position transducer having a single-phase winding excited by a higher frequency current and three-phase output windings in which three-phase voltages with amplitude variation of N cycles per revolution are induced. Although conventional NX-synchros with brushes or a rotary transformer can be used, it is preferable to use a novel variable reluctance type with simple construction which is disclosed in application U.S. Pat. No. 5,446,966, issued Sep. 5, 1995.

To make understanding easy, a control scheme of a one-quadrant variable speed drive is described at first, which is often used to drive a pump, a blower, or a compressor, etc., that only requires a motoring mode.

A synchronous reluctance motor with 2N poles and an NX-synchro which both have three-phase windings represented as a-, b- and c-phase in the stator and a salient pole in the rotor are coupled directly. In this case, the three-phase voltages, demodulated from the output voltages of the NX-synchro so as to remove the same high frequency carrier component as the exciting current, have approximate sinusoidal waveforms whose frequency is synchronized with the rotation of the synchronous reluctance motor and whose phase is related to the relative position of both the salient pole centers when running at a constant speed.

When both the rotors are directly coupled so that the demodulated a-phase voltage of the NX-synchro has a value equal to its positive peak value multiplied by the cosine of an angle selected as the MMF phase angle when a pole center of the synchronous reluctance motor is located in the position of its a-phase winding axis, the demodulated voltages can be directly used as the above-mentioned base current instructions for the inverter currents. The inverter currents feeding the motor are controlled according to the current instruction determined by multiplying these phase current instructions by an amplitude current instruction obtained from a PI controller based on detected speed deviation. Therefore, this method makes possible to produce base current instructions by a simple circuit and to reduce the cost since the expensive R/D converter used in the conventional scheme is not necessary.

In the one-quadrant drive system, it is also possible to produce the three-phase current instruction by using output voltages of an NX-synchro with only two windings in three-phase. That is, two current instructions in three-phase can be obtained in the foregoing manner and the third current instruction obtained by changing the sign of sum of the two current instructions.

However, four-quadrant drives are required in servo motor applications to make possible forward and reverse rotation with a fast speed response. In the synchronous motor drive using the MMF phase angle constant control scheme, deceleration and reverse rotation are easily performed by reversal of the sign of the MMF phase angle which also reverse the direction of torque.

The MMF phase angle is often selected to be 60 degrees in synchronous reluctance motors because it gives a good running performance. In this case, both the rotors of a reluctance motor with 2N poles and an NX-synchro are directly coupled so that the demodulated a-phase voltage of the NX-synchro has a value equal to its positive peak value multiplied by $\cos(\pi/3)$ when the center of a salient pole of the motor is located in its a-phase winding axis.

When the demodulated a-, b- and c-phase voltages of the NX-synchro are directly used as the phase current instructions of the a-, b- and c-phase of the synchronous reluctance motor, the MMF phase angle becomes 60 degrees and the produced positive torque accelerates and runs the rotor in the forward direction. On the other hand, if the connection is changed over so that the demodulated b-, c- and a-phase voltages of the NX-synchro are used as the phase current instructions of the a-, b- and c-phase of the synchronous reluctance motor, the MMF phase angle becomes −60 degrees and the produced negative torque decelerates or runs the rotor in the reverse direction. Inverter currents feeding the motor are controlled according to the current instructions determined by multiplying these phase instructions by the amplitude current instruction obtained from the PI controller based on the detected speed deviation or calculated from a given torque instruction.

Therefore, this method makes possible to produce phase current instructions by a simple circuit and to reduce the cost since the expensive R/D converter used in the conventional scheme is not necessary.

Although the above mentioned drive of a synchronous reluctance motor keeping the MMF phase angle 60 degrees shows a good running performance in many cases, there may be the case where another MMF phase angle is preferable for some speed especially in a wide range speed control. In this case, a phase shifter can be used to give the phase instruction selected for the best performance in a specified speed range.

It is possible to use an NX-resolver with two-phase output windings instead of above mentioned NX-synchro. In this case, the three-phase voltages converted from two-phase output voltages of the resolver by a two- to three-phase converter can be used as phase current instructions in the aforementioned manner after having been demodulated.

Although so far the explanation of the present invention has been made on its application to synchronous reluctance motors, it is clear that the present invention can also apply to permanent magnet synchronous motors and field winding type synchronous motors because the torque of all of these motors can be controlled by the MMF phase angle and the amplitude of armature current.

However, optimum MMF phase angles of these motors are different from that of synchronous reluctance motors such that surface mounted permanent magnet synchronous motors and field winding type synchronous motors have 90 degree MMF phase angles and interior permanent magnet synchronous motors have 120 degree MMF phase angles. Therefore, in the case of these motors, the method of setting the relative position of both the rotors when coupling them directly to each other and the change over method of phase current instructions for forward and reverse torque production should be different from those of reluctance synchronous motors and especially in the case that the MMF phase angle is equal to 90 degrees, the four quadrant drive can be performed without a phase change over circuit, as described later.

So far, speed control scheme based on a speed instruction were explained. However, a torque control scheme is also easily possible by providing a current amplitude instruction signal based on a torque instruction instead of the PI controller.

The above and other objects, features, and advantages of the present invention will become more apparent from the following detailed description with reference to the drawings.

DETAILED DESCRIPTION OF THE PREFERRED EMBODIMENTS

Figure 1:
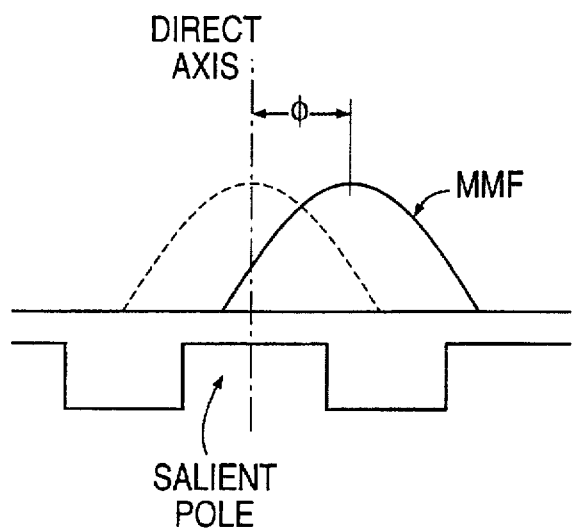
FIG. 1 is a diagram which is used to illustrate the MMF phase angle.

At first, the principle of the speed control scheme of synchronous reluctance motors used in the present invention will be outlined. The torque of current controlled synchronous reluctance motors is expressed as follows:

$$T = \frac{3N}{4} (L_{ad} - L_{aq}) i_m^2 \sin(2\phi) \tag{1}$$

where $i_m$ is an amplitude of the armature current, $L_{ad}$ and $L_{aq}$ are direct-axis and quadrature-axis armature reaction inductances, N is the number of pole-pairs of the synchronous reluctance motor and $\phi$ is the MMF phase angle which is a space angle in electrical radians between the peak position of the MMF and the direct axis of the rotor as shown in FIG. 1. Therefore, it is clear from Eq. (1) that if the value of $\phi$ is kept constant, the torque can be controlled by the magnitude of the current amplitude $i_m$. The present invention offers a simple method to keep the MMF phase angle at a selected value, which is an essential point in this control system.

FIG. 1 is a diagram showing the relationship between the salient poles and the air gap distributions of the MMF, though negative half waves have been omitted for simplicity. If the current of the a-phase has a maximum value whenever the direct axes of the rotor reach the positions of the magnetic axes of its winding in the synchronously running condition, the peak position of the MMF always keeps the same positions as the direct axes as shown by the dashed line in FIG. 1 and this is the situation in which the MMF phase angle $\phi$ is zero. Therefore, if the phase of the armature current is in advance of the one mentioned just before by an instruction value $\phi^*$, the positions of the peaks of the MMF also are in advance of the direct axes by $\phi^*$ as shown by the solid line in FIG. 1; this is the situation in which the MMF phase angle is equal to $\phi^*$.

Therefore, it is possible to keep the MMF phase angle $\phi$ at a selected value by controlling the armature current phase based on the detected position of the pole center. That is, when the position of a direct axis $\theta_o$ is represented as $\theta_o = \omega t$ in electrical radians, if the armature currents of the synchronous reluctance motor are always kept at the values shown by the following formulas:

$$i_a^* = i_m^* \cos(wt + \phi^*) \quad (2)$$

$$i_b^* = i_m^* \cos\left(wt + \phi^* - \frac{2}{3}\pi\right)$$

$$i_c^* = i_m^* \cos\left(wt + \phi^* - \frac{4}{3}\pi\right)$$

then the motor can be driven so as to keep the MMF phase angle $\phi^*$ constant and its torque is determined by the amplitude $i_m^*$ as seen from Eq. (1).

Figure 2:
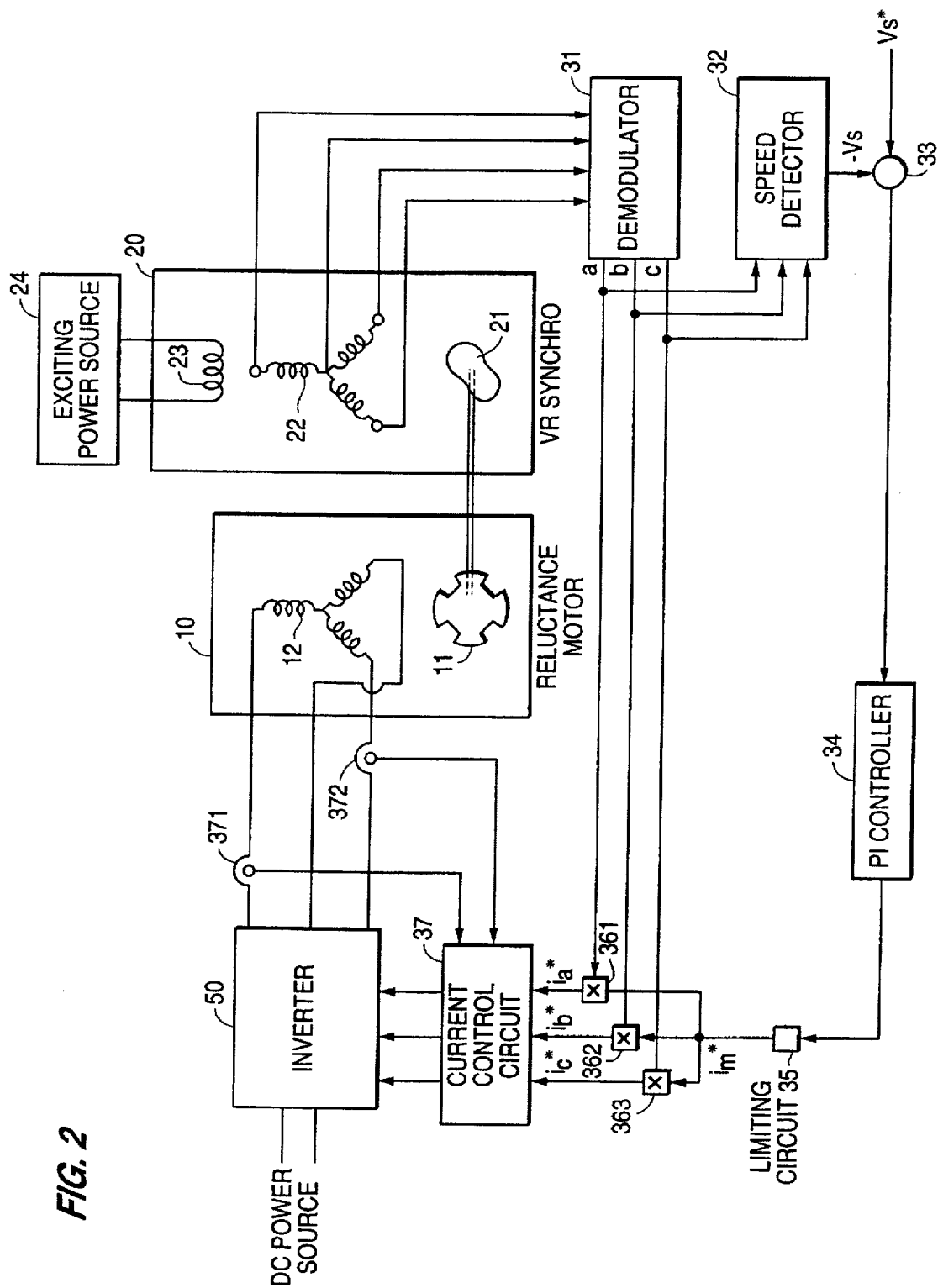
FIG. 2 is a block diagram for a speed control method of a 4-pole synchronous reluctance motor directly using demodulated three-phase output voltages of a variable reluctance (abbreviated VR) type 2X-synchro as the phase current instruction in accordance with an embodiment of the present invention.

FIG. 2 is a block diagram of a one-quadrant drive of a synchronous reluctance motor in accordance with an embodiment of the present invention. Because it is necessary for the number of poles of the synchro to be equal to one half of the number of poles of the motor so that the electrical angle of both the motor and synchro coincide with each other, a 4-pole reluctance motor 10 and a VR type 2X-synchro 20 are used in FIG. 2. The stator of the synchronous reluctance motor has three-phase windings 12 and that of the synchro also has three-phase windings 22. The rotor of the synchronous reluctance motor has salient poles 11 and the rotor of the synchro also has salient poles 21. Both the rotors are directly coupled so that the a-phase voltage demodulated through a demodulator 31 from the output of 2X-synchro has its peak value multiplied by $\cos(\phi^*)$ when a direct axis of the motor is located in its a-phase winding axis. The stator of the synchro also has another single phase exciting winding 23 to which the current with frequency of several kHZ is supplied from a exciting power source 24.

The induced voltages in the output windings of the synchro when running at an angular velocity 60 in electrical radians per second are as follows:

$$e_a = E_m \cos(wt + \phi^*) \cdot \sin(w_e t) \quad (3)$$

$$e_b = E_m \cos\left(wt + \phi^* - \frac{2}{3}\pi\right) \sin(w_e t)$$

$$e_c = E_m \cos\left(wt + \phi^* - \frac{4}{3}\pi\right) \sin(w_e t)$$

wherein $E_m$ is the amplitude of the voltage and $\omega_e$ is the angular frequency of the exciting current. Since these equations are formulas of usual amplitude modulation signals, the envelope waveform in which a carrier wave with a frequency $\omega_e$ was removed by a demodulator 31 can be obtained at its output terminals. Any method of demodulating an amplitude modulation signal that is well known among those skilled in art can be used for the demodulator 31. It is easily possible to make the amplitude $E_m$ equal to 1 by regulating the exciting current. Therefore, the following voltages can be obtained at the output terminals a, b and c of the demodulator 31;

$$e_a = \cos(wt + \phi^*) \quad (4)$$

$$e_b = \cos\left(wt + \phi^* - \frac{2}{3}\pi\right)$$

$$e_c = \cos\left(wt + \phi^* - \frac{4}{3}\pi\right)$$

Although a speed detector such as a tachometer generator can be used to obtain a voltage signal of either a positive polarity or negative polarity depending on the rotating direction of the motor, the demodulated output voltage of NX-synchro is shown as being obtained from a speed detector 32 in FIG. 2.

Figure 3:
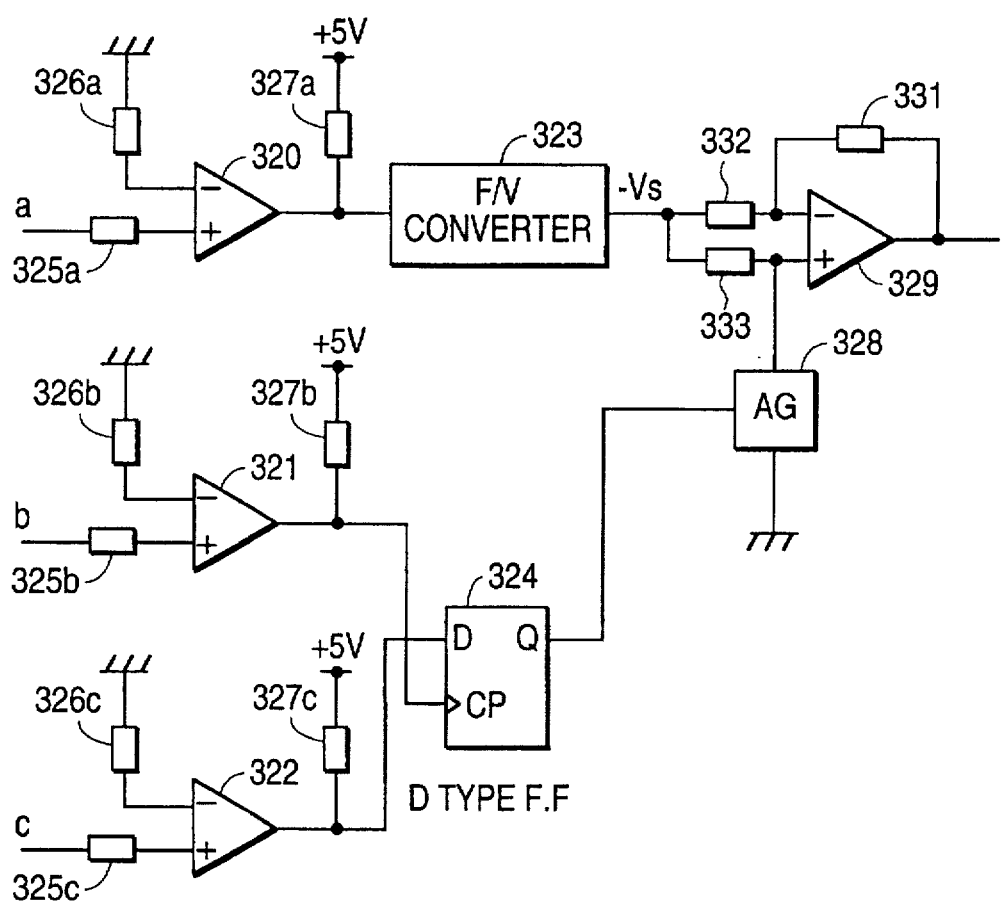
FIG. 3 is a schematic diagram showing, in detail, a speed detector of FIG. 2.

FIG. 3 shows an example of a circuit of the speed detector 32. The output voltages from demodulator 31 are available for the speed detector, that is, the a-phase voltage is fed to an input terminal of a F/V converter 323, and the b- and c-phase voltages are fed to CP and D terminals of a D flip-flop 324 via respective comparators. These comparators are composed of operational amplifiers 320, 321 and 322 respectively. To their positive input terminals are fed three-phase voltages as shown by Eq. (4) via input resistors 325a, 325b and 325c from the output terminals a, b and c of the demodulator 31 and their negative terminals are grounded via resistors 326a, 326b and 326c. A voltage of +5 volts is supplied to the output terminals of these amplifiers via resistors 327a, 327b and 327c.

The F/V converter 323 outputs a negative voltage signal $V_s$ in proportion to the speed of the motor. Its output terminal is connected to an operational amplifier 329, which has a feedback resistor 331, via input resistors 332 and 333. The positive input terminal of the amplifier 329 is connected to an analog gate 328 whose input control terminal receives the output signal from the Q terminal of D flip-flop 324.

Figure 4A:
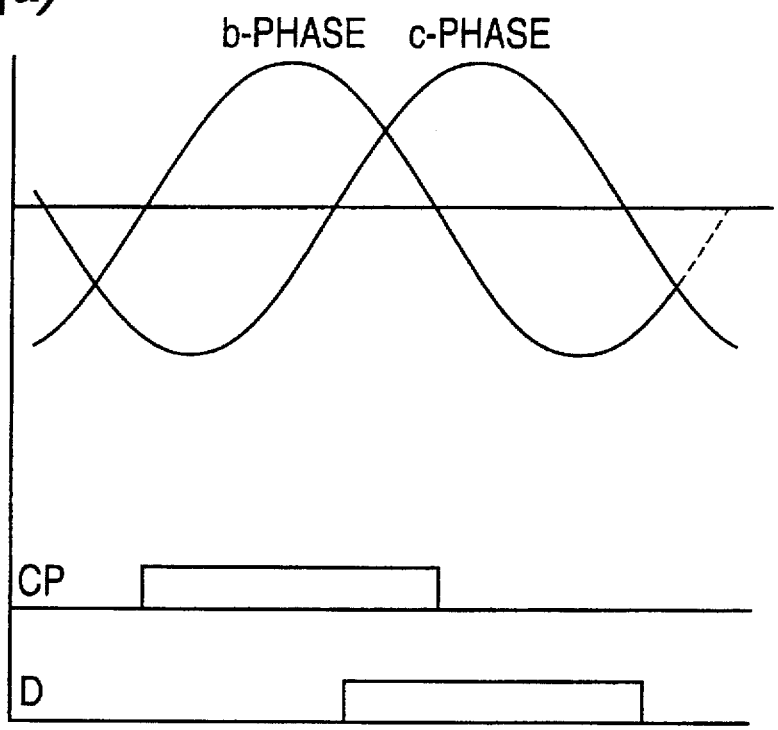
FIGS. 4(a) and (b) are graphs which are used to illustrate the operation of the control apparatus of the speed detector of FIG. 3.
Figure 4B:
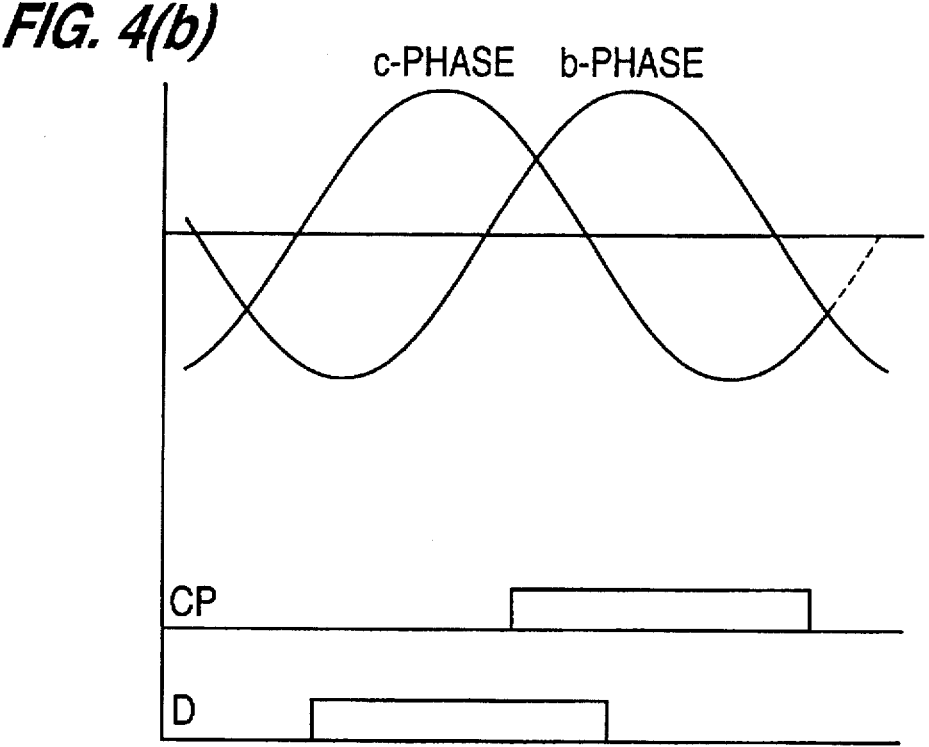

The operation of this circuit is discussed below with reference to FIGS. 4(a) and 4(b). Since the b-phase voltage is in advance of c-phase voltage in the forward rotation direction by 120 degrees, the D terminal is always kept at a low level whenever the voltage of the CP terminal changes from a low level to a high level as shown in FIG. 4(a). On the other hand, since the phase sequence of b-and c-phase is reversed during the reverse rotation, the D terminal is always kept at a high level whenever the voltage on the CP terminal changes from a low level to a high level as shown in FIG. 4(b). As a result, the D flip-flop 324 produces a low level control signal at the output terminal Q during the forward rotation of the motor and a high level control signal during the reverse rotation of the motor. An output signal of the D flip-flop 324 is fed to the control input of the analog gate 328 which is rendered conductive and the positive terminal of the operational amplifier 329 is grounded when its control input has a high level. Consequently, the sign of $V_s$ at the output terminal of the operational amplifier 329 is changed during the reverse rotation. Therefore, the voltage signal of the output terminal 329 has an absolute value which is in proportion to the motor speed and its sign becomes negative during the forward rotation of the motor and positive during the reverse rotation of the motor. The output voltage is fed to the comparator 33.

The comparator 33 is an adder composed of an operational amplifier. The output voltage signal ($-V_s$) of the speed detector 32 and a voltage signal ($V_s^*$) which is proportional to the speed instruction are fed to the comparator 33 and produces a signal ($V_s^*-V_s$) in output, the signal corresponding to the difference the two input signals.

The signal ($V_s^*-V_s$) is fed to a PI controller 34 which is well known among those skilled in the art. A current amplitude instruction signal i* is produced by the PI controller 34 based on the input signal ($V_s^*-V_s$) and is fed to three multipliers 361, 362 and 363 via a current limiter 35 which limits the amplitude to protect the semiconductor devices used in the inverter.

To the input terminals of multipliers 361, 362 and 363 are fed three-phase voltages as shown by Eq. (4) from the output terminals a, b and c of the demodulator 31 and the amplitude instruction signal $i_m^*$ produced by the PI controller 34 and limited by the limiting circuit 35. The three-phase current instruction signals shown by Eq. (2) obtained by multiplying these signals are fed from output terminals of the multipliers 361, 362 and 363 to a current control circuit 37.

The current control circuit 37 produces gate control signals for the inverter 50 based on the current instruction signals from the multipliers 361, 362 and 363 and the output signals from current detectors 371 and 372.

When the inverter 50 is controlled to supply the same currents to the motor as the current instructions shown by Eq. (2), the motor can be driven at the instructed speed. In this control scheme, the instruction value of the MMF phase angle φ* is a very important value affecting the performance of motor, and is selected to be 60 degrees for synchronous reluctance motors because it results in good performance in many cases.

Figure 5:
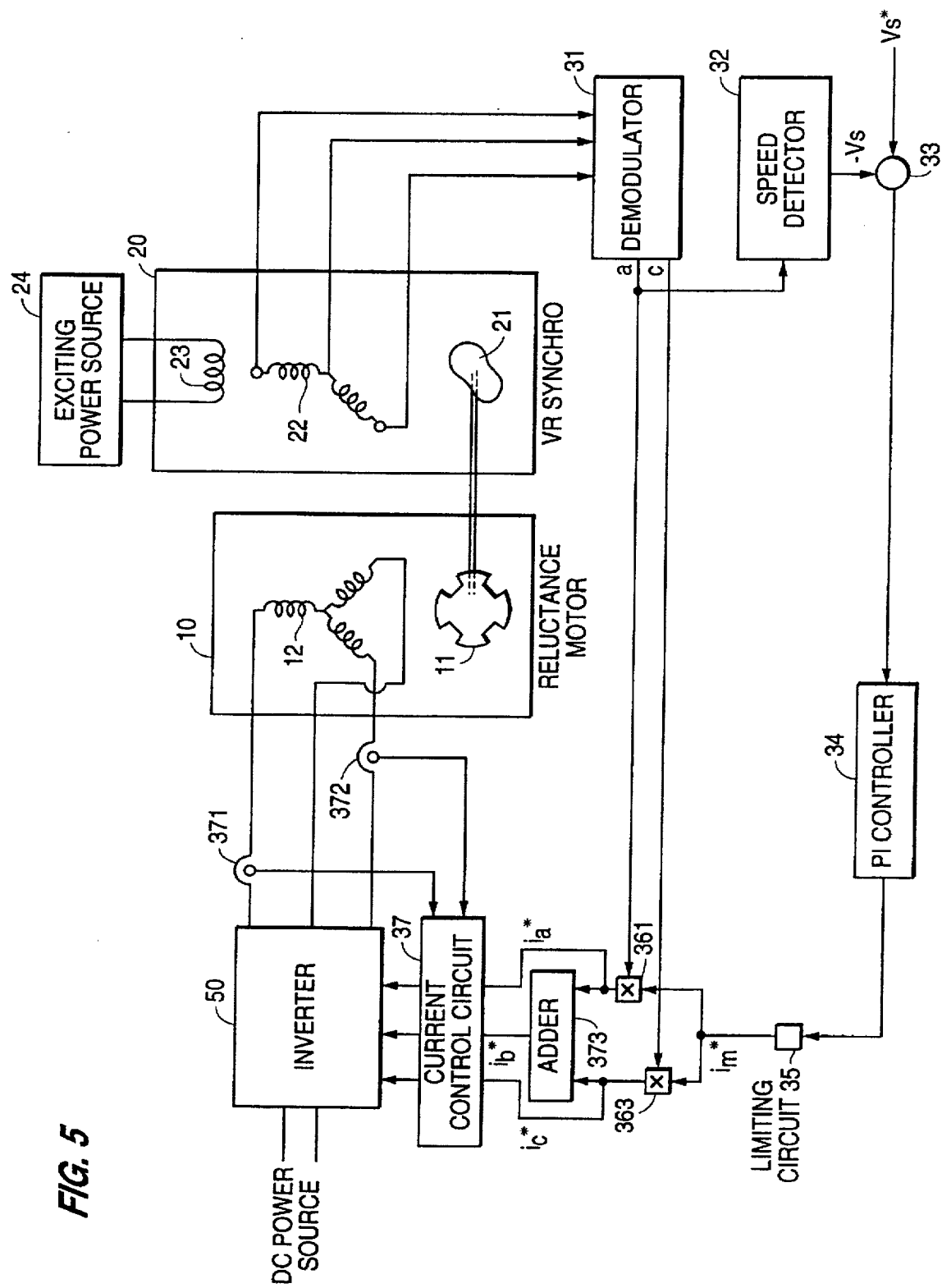
FIG. 5 is a block diagram for a speed control method of a 4-pole synchronous reluctance motor directly using demodulated two output voltages of a VR type 2X-synchro with only two of the three three-phase windings used as two current phase instructions, from which the third phase is synthesized in accordance with an embodiment of the present invention.

Although the control schemes using three-phase voltages of the synchro were described with the reference of FIG. 2, it is possible to use only two voltages of a synchro in the one-quadrant speed control scheme and its example is shown in FIG. 5. The NX-synchro 20 in FIG. 5 has only a-phase and c-phase output windings 22 and the operations of the demodulator 31 and multipliers 361 and 363 are also carried out in the same manner for these two phases as the aforementioned three-phase case. Since this scheme is used in only a one-quadrant speed control and the rotating direction is never reversed, it is unnecessary to change the sign of the output signal of the speed detector. Accordingly, the speed detector 32 is only composed of a F/V converter whose input terminal receives the a-phase output signal of the demodulator 31 which is fed thereto via a comparator. Since the sum of the instantaneous values of the three-phase currents is equal to zero, $i_b^*$ can be obtained by performing the following operation in an adder 373 from $i_a^*$ and $i_c^*$;

$$i_b^* = -(i_a^* + i_c^*). \tag{5}$$

As shown in FIGS. 2 and 5, the present invention can extremely simplify the control devices of one-quadrant variable speed drives often used for pumps, blowers, etc., that require only a motoring mode. Although a one-quadrant variable speed drive of synchronous reluctance motors can be performed by the open loop frequency control, the MMF phase angle constant control method shown in FIGS. 2 or 5 has far better efficiency at light load than the ordinary frequency control. This fact is very effective in saving energy for the variable speed drive of a pump, fan and a blower, etc., whose load torques vary in proportion to the speed squared.

Figure 6:
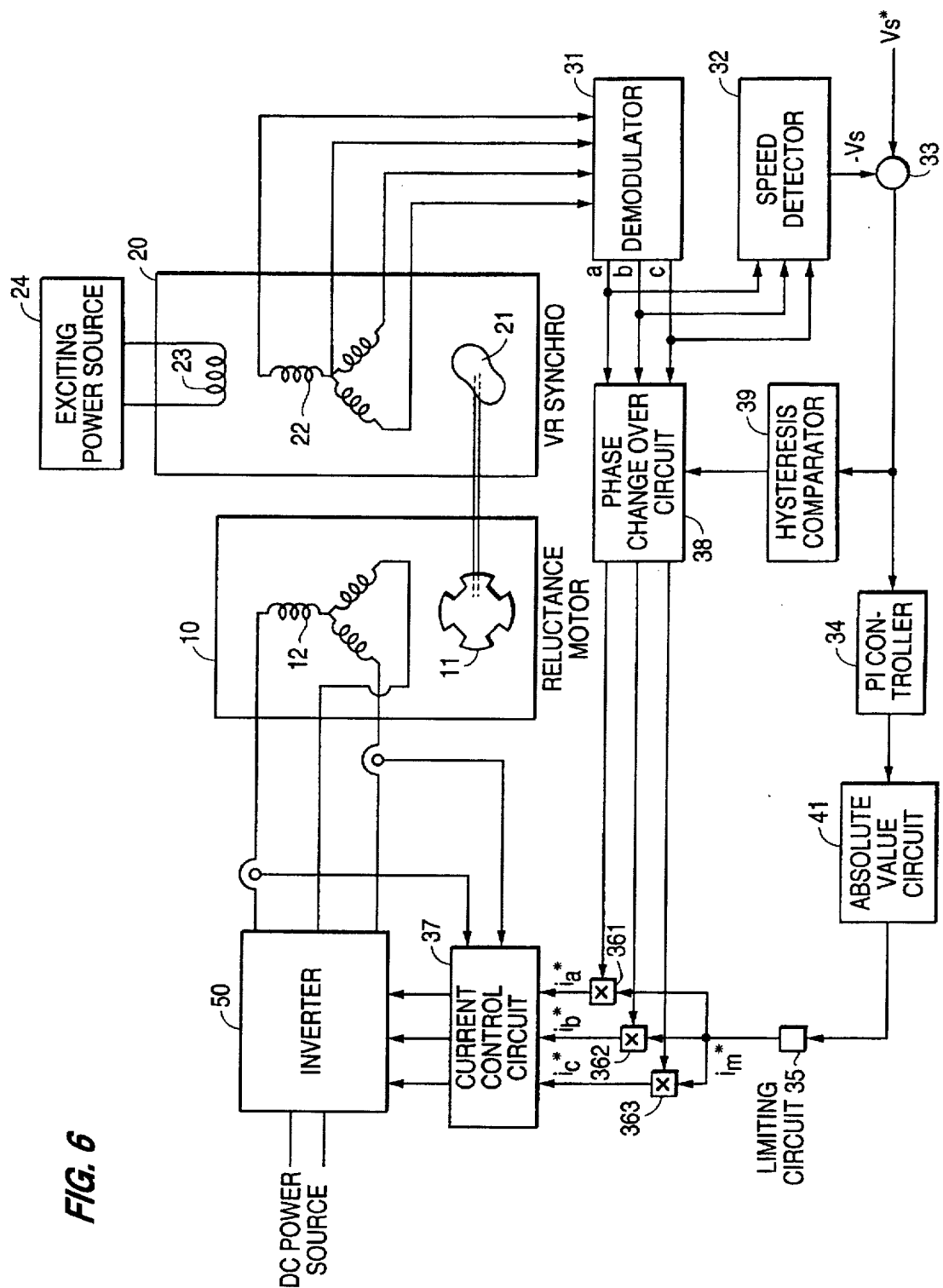
FIG. 6 is a block diagram for a speed control method of a 4-pole synchronous reluctance motor using demodulated three-phase output voltages of a VR type 2X-synchro with a phase change over device in accordance with an embodiment of the present invention.

However, reverse running and fast speed response in not only acceleration but also deceleration are required in the applications such as servo motors. Such a drive can be performed by providing a phase changeover circuit 38 between the demodulator 31 and multipliers 361, 362 and 363 as shown in FIG. 6.

It is clear from Eq. (1) that the torque of a synchronous reluctance motor can change to the reverse direction by making the sign of the MMF phase angle φ negative.

When the demodulated a-, b- and c-phase voltages of the NX-synchro are directly used as the current phase instructions of the a-, b- and c-phase of the synchronous reluctance motor, the MMF phase angle becomes 60 degrees and a positive torque is produced, resulting in forward running. On the other hand, for deceleration using regenerative braking or reverse rotation the connection is changed over by a phase changeover circuit 38 so that the demodulated b-, c- and a-phase voltages are used as the current phase commands of the a-, b- and c-phase of the reluctance motor, where the MMF phase angle becomes −60 degrees and a negative torque is produced.

Figure 7:
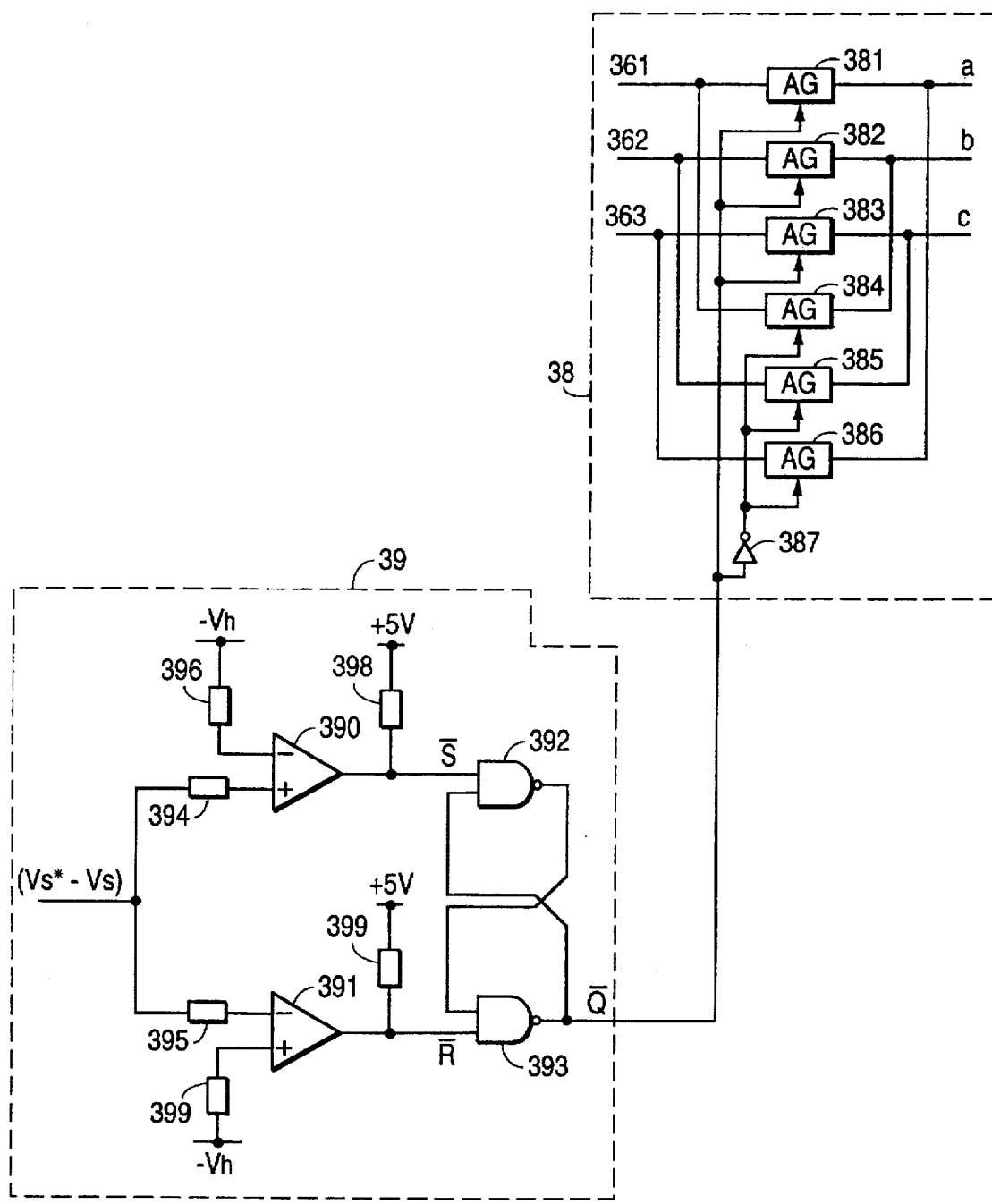
FIG. 7 is a schematic diagram showing, in detail, the phase change over circuit and hysteresis comparator of FIG. 6.

As shown in FIG. 7, the phase changeover circuit 38 is composed of six analog gates 381, 382, 383, 384, 385 and 386 which are rendered conductive by a high level signal applied to control input terminals and a inverter 387. The output signals from the a, b and c terminals of the demodulator 31 are introduced into the input terminals of these six analog gates as follows; the signal from the a-terminal is introduced into input terminals of 381 and 386, the signal from b-terminal into input terminals of 382 and 384, and the signal from c-terminal into input terminals 383 and 385.

The operation of the phase change-over circuit 38 is directed from the hysteresis comparator 39 as discussed below with reference to FIG. 7. Although various circuits are well known for use as a hysteresis comparator, an example is shown in FIG. 7. This circuit consists of two comparators composed of operational amplifiers 390 and 391 and two NAND gates 392 and 393. The signal $(V_s^* - V_s)$ from the comparator 33 is fed to the positive input terminal of amplifier 390 via input resistor 394 and to the negative input terminal of amplifier 391 via input resistor 395. To the negative input terminal of amplifier 391 is applied a voltage $-V_h$ via a resistor 396 and to the positive input terminal is applied a voltage $V_h$ via resistor 397. The output terminals of comparators 390 and 391 receive a voltage of 5 volts via resistors 398 and 399 respectively, and are connected to S and R input terminals of an RS flip-flop composed of NAND gates 392 and 393. An output signal from the Q terminal of the RS flip-flop is directly fed to the control inputs of the analog gates 381, 382 and 383, and is fed to the control gates 384, 385 and 386 via inverter 387 in the phase changeover circuit 38.

The operation of the hysteresis comparator 39 is discussed below. When the value of $(V_s^* - V_s)$ is positive, the S and R terminals of RS flip-flop circuit are at a high level and low level respectively, resulting in a high level signal from the Q terminal. Even if the value of $(V_s^* - V_s)$ approaches zero, the Q terminal keeps outputting a high level signal as long as its value is greater than $-V_h$. On the other hand, when $(V_s^* - V_s)$ has a negative value, the signal level of the output terminals of the RS flip-flop are reversed, resulting in a low level signal from the $\overline{Q}$ terminal as long as its value is smaller than $V_h$.

When a speed instruction signal $V_s^*$ with positive value is provided, the motor accelerates and runs in the forward direction. Since in this condition the speed difference signal $(V_s^* - V_s)$ has a positive value, the $\overline{Q}$ terminal outputs a high level signal to the phase changeover circuit 38. Therefore, analog gates 381, 382 and 383 are rendered conductive and 384, 385 and 386 are rendered nonconductive, thereby directly connecting the three-phase output voltages from a-, b- and c-terminals of the demodulator 31 to the input terminals of multipliers 361, 362 and 363. In this condition the MMF phase angle is kept at 60 degrees and a positive torque is produced.

When the speed instruction signal $V_s^*$ is changed to zero from a certain positive value, the speed difference signal $(V_s^* - V_s)$ change to a negative value and the voltage at the $\overline{S}$ and $\overline{R}$ terminals of the RS flip-flop change to low level and high level respectively. Therefore, since the output signal of the hysteresis comparator changes to a low level, the analog gates 381, 382 and 383 are rendered nonconductive and the gates 384, 385 and 386 are rendered conductive. In this condition b- c- and a-phase output voltages of the demodulator 31 are connected to the multipliers 361, 362 and 363, and thus the MMF phase angle is changed to −60 degrees to reverse the torque direction and the motor stops rapidly by regenerative braking torque. Since the amplitude instruction signal $i_m^*$ has to be positive regardless of the negative value of $(V_s^* - V_s)$ to produce a reverse torque in this case, the output of the controller 34 is fed to the multipliers 361, 362 and 363 via an absolute value circuit 41 composed of an operational amplifier. It is also clear that if a negative value is output as the speed instruction signal at standstill, the motor runs in the reverse direction in the same manner as that mentioned just before.

Although an operation is carried out to reverse the phase sequence of armature current for reverse rotation in the conventional scheme, it is not necessary in the present invention because the phase sequence of the voltages induced in the output winding of the NX-synchro is automatically reversed according to the reverse rotation. Therefore, the present invention makes possible the four-quadrant variable speed drive of a synchronous reluctance motor by a very simple scheme as compared with the conventional method.

Figure 8:
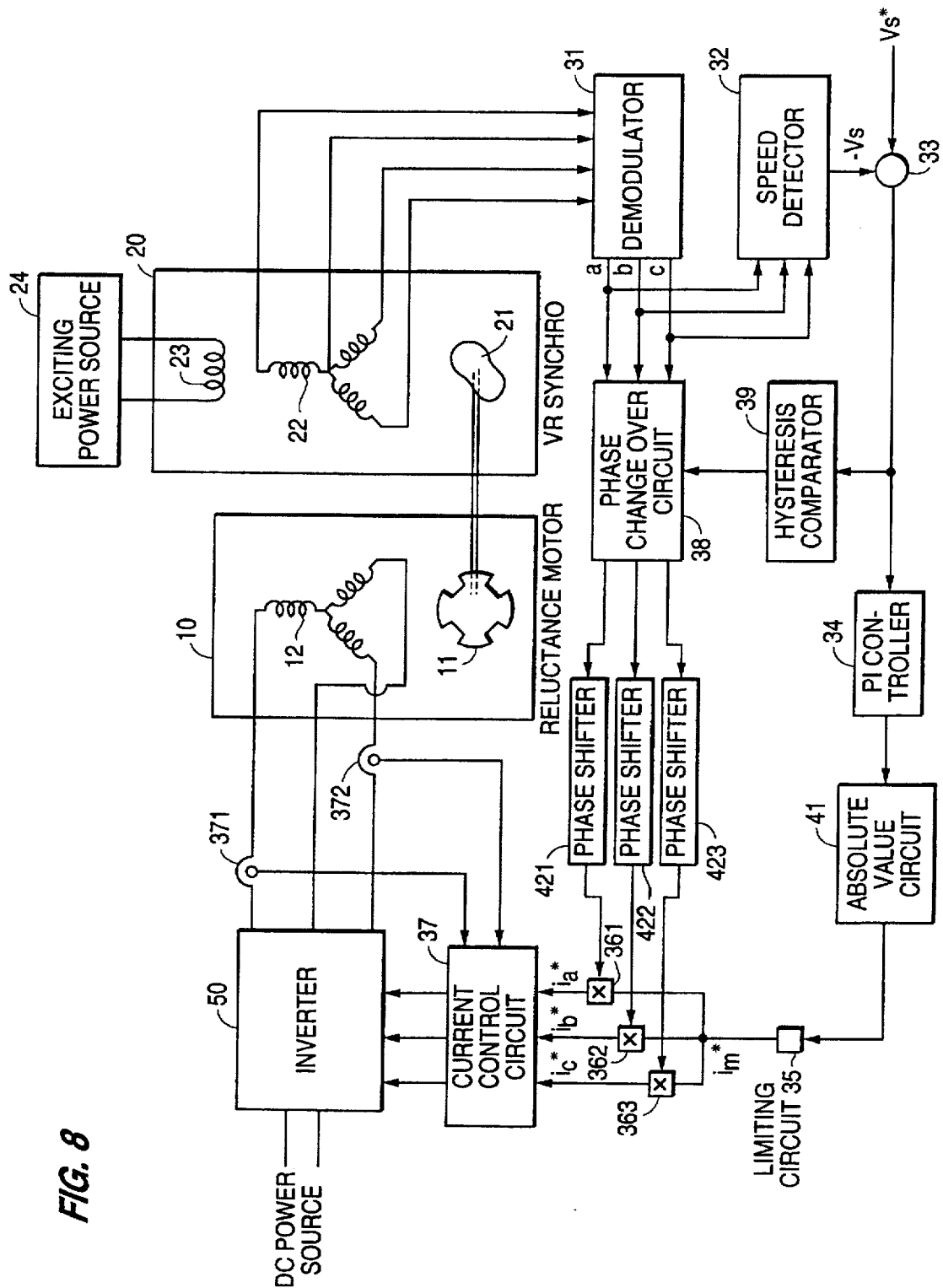
FIG. 8 is a block diagram for a speed control method of a 4-pole synchronous reluctance motor using demodulated three-phase output voltages of a VR type 2X-synchro with a phase change over device and phase shifter in accordance with an embodiment of the present invention.

Although the above mentioned drive of a synchronous reluctance motor keeping the MMF phase angle at 60 degrees results in good running performance in many cases, there may be the case where another MMF angle is preferable for some speed especially in wide range speed control. In this case, three phase shifters 421, 422 and 423 can be used to revise the current phase instruction from 60 degrees to the preferable value in a specified speed range as shown in FIG. 8.

Although the phase voltages of the NX-synchro were used in above description for simplicity of explanation, the terminal voltages can of course be used by considering their phase difference from the phase voltages.

So far, speed control schemes based on a speed instruction were explained. However, a torque control scheme based on a torque instruction is also easily possible by using a circuit for calculating the armature current amplitude instruction $i_m^*$ based on Eq. (1) from the torque instruction as shown in FIG. 9, or by providing a current amplitude instruction signal corresponding to a position of mechanical operational part as shown in FIG. 10 instead of the PI controller 34.

Figure 9:
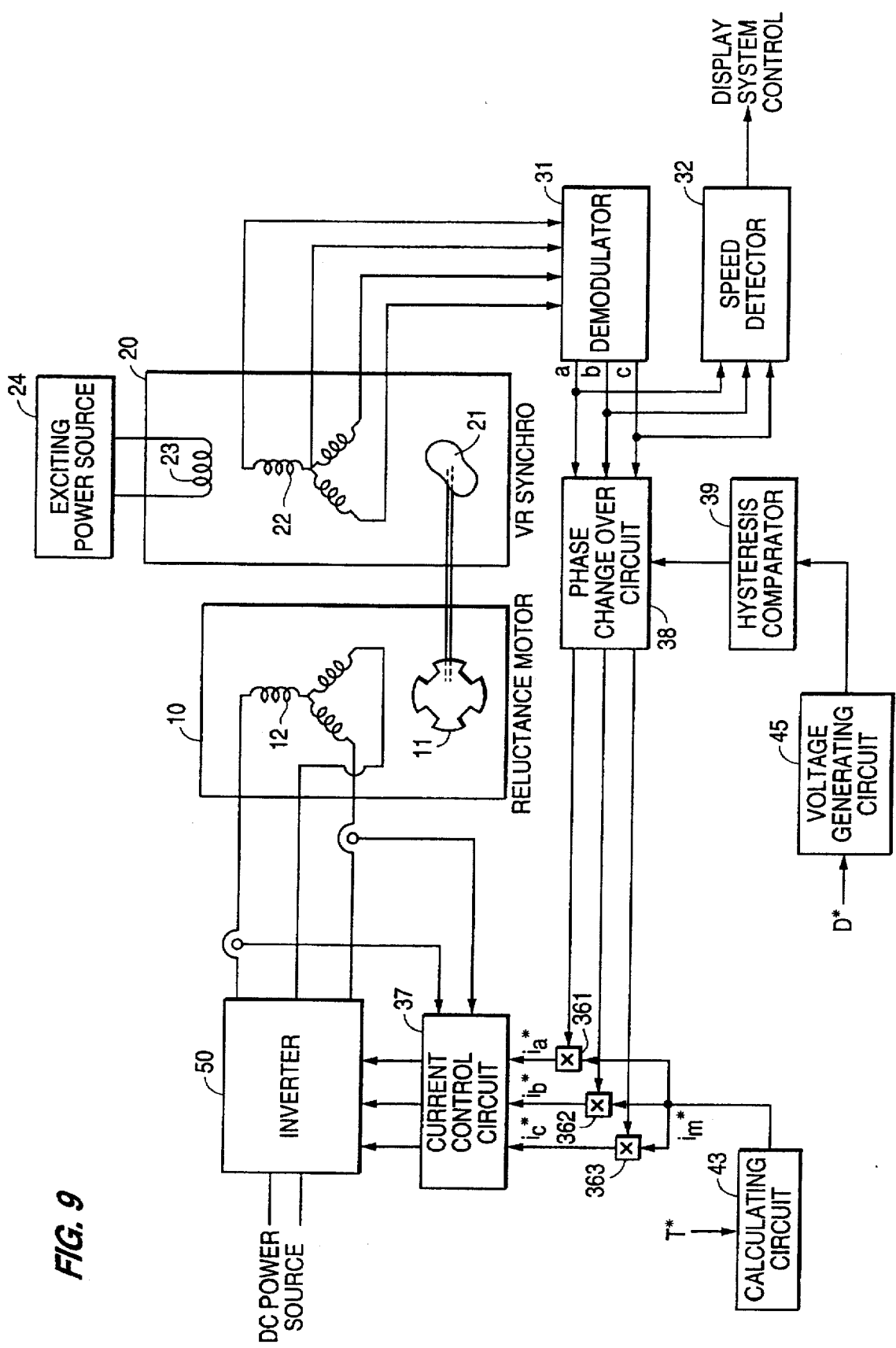
FIGS. 9 and 10 are block diagrams of modifications of the speed control method of FIG. 8.
Figure 10:
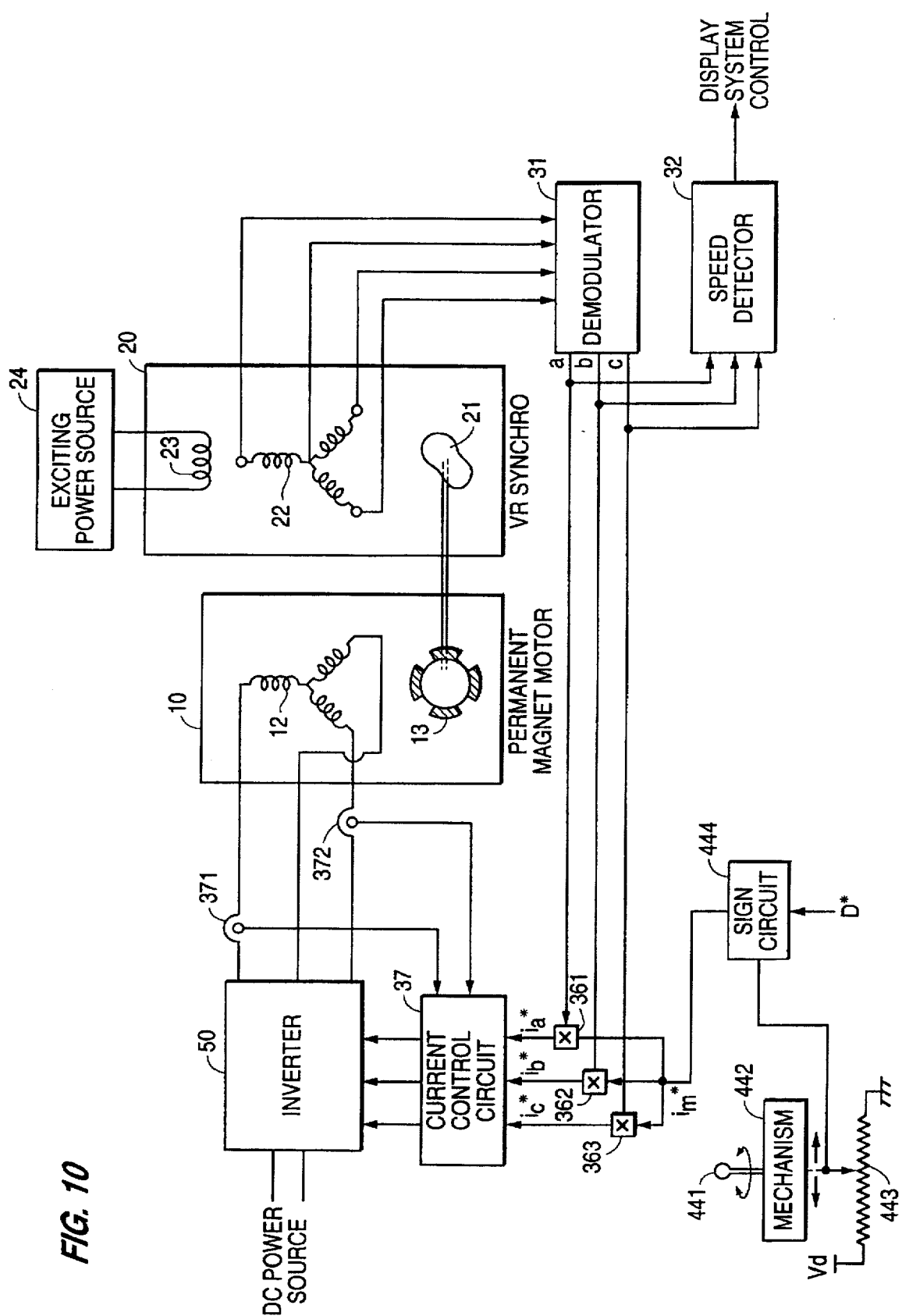
Figure 11:
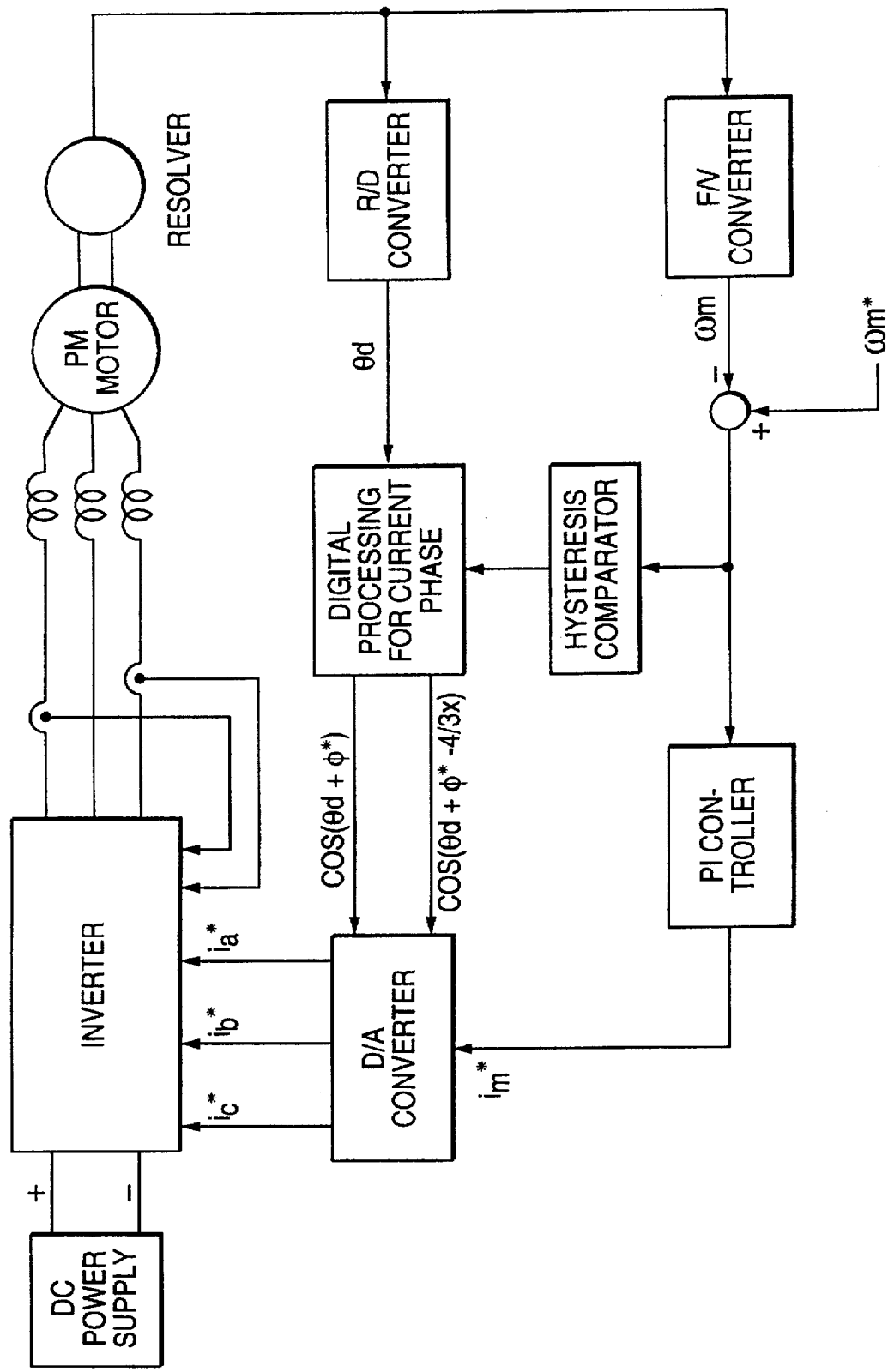
FIG. 11 is a block diagram for a prior art speed control method of a PM motor.

FIG. 9 is a block diagram showing a torque control method of a synchronous reluctance motor in accordance with an embodiment of the present invention, where the current amplitude instruction signal $i_m^*$, calculated by using Eq. (1) from a given torque instruction T*, is provided from a calculating circuit 43 and input to three multipliers 361, 362 and 363. The operation of the phase change over circuit 38 is directed from the hysteresis comparator 39 in the same manner as aforementioned explanation on FIG. 7 except that a positive or negative voltage provided by a voltage generating circuit 45 corresponding to the forward or reverse torque direction instruction D* is given instead of the voltage $(V_s^* - V_s)$.

Although both a 4 pole synchronous reluctance motor and a VR type 2X-synchro are shown as inner-rotor construction in FIG. 2, FIG. 5, FIG. 6 and FIG. 8, the present invention can be also applied to the case where they both have an outer-rotor construction.

It is possible to use an NX-resolver with two-phase output windings instead of the above-mentioned NX-synchro. In this case, the three-phase voltages converted from two-phase voltages by a two- to three-phase converter can be used as current phase instructions in the aforementioned manner after having been demodulated.

The torque of surface mounted permanent magnet synchronous motors and field winding type synchronous motors is expressed as follows:

$$T = \frac{3N}{2} K B_m i_m \sin(\phi) \qquad (6)$$

and in the case of interior permanent magnet synchronous motors the expression of torque is expressed as follows:

$$T = \frac{3N}{2} \left\{ K B_m i_m \sin(\phi) + \frac{1}{2} (L_{ad} - L_{aq}) i_m^2 \sin(2\phi) \right\} \qquad (7)$$

where $B_m$ is the amplitude of air gap flux density distribution produced by the field current or permanent magnet.

Since these expressions show that the torque of these motors depends on the MMF phase angle $\phi$ and the amplitude of current $i_m$ in the same manner as the synchronous reluctance motors, their speed control can be carried out by the scheme shown in FIG. 2, FIG. 5, FIG. 6 and FIG. 8 by changing the motor.

However, the optimum MMF phase angles of these motors are different from that of synchronous reluctance motors such that the optimum phase angles of surface mounted permanent magnet synchronous motors and field winding type synchronous motors are 90 degrees and that of interior permanent magnet synchronous motors is 120 degrees. Therefore, in the case of these motors, the method of setting the relative position of both the rotors when directly coupled and the changeover method of current phase instructions for forward and reverse torque production should be different from those of a synchronous reluctance motor as follows:

In the case of a 90 degree MMF phase angle, both the rotors are directly coupled so that the demodulated a-phase voltage of the NX-synchro become zero when the center of a direct-axis of the motor is located in its a-phase winding axis, and the changeover circuit 38 is unnecessary for four quadrant drive, because the output signal of the PI controller has a negative value $(-i_m^*)$ when its input signal $(V_s^* - V_s)$ has a negative value and the MMF phase angle becomes $-90$ degrees as shown by the following equation:

$$-i_m^* \cos(\omega t + \pi/2) = i_m^* \cos(\omega t - \pi/2) \qquad (8)$$

So, the most simple control scheme shown in FIG. 2 can be used for not only the one quadrant drive but also the four quadrant drive of surface mounted permanent magnet synchronous motors and field winding type synchronous motors.

FIG. 10 is a block diagram showing a torque control method of a 4-pole motor with permanent magnets 13 mounted on the rotor surface in accordance with an embodiment of the present invention, where the current amplitude instruction signal $i_m^*$ is produced by a control lever 441 and a given torque direction instruction D*. That is, the sliding contact of potentiometer 443 is moved by a mechanism 442 depending on the movement of the control lever 441, from which a voltage is provided as a current amplitude instruction signal and the sign of its voltage is determined by a sign circuit 444 based on a given torque direction instruction D* so that a plus sign is given for a forward torque and a negative sign for a reverse torque.

In the case of a 120-degree MMF phase angle, both the rotors are directly coupled so that the demodulated a-phase voltage of NX-synchro has its positive peak value multiplied by $\cos(2\pi/3)$ when the direct-axis of the motor is located in its a-phase winding axis, and the changeover of the connection to obtain the negative torque is performed so that the demodulated c-, a- and b-phase voltage are used as the current phase instructions of a-, b- and c-phase of the interior permanent magnet synchronous motor.

As described above, according to the present invention, the simplification of speed and torque control apparatus of all kinds of synchronous motors can be realized, resulting in reduction of cost and an increase of reliability for variable drive system used in the various industrial fields.

What is claimed is:

1. An apparatus for controlling a synchronous motor having 2N poles, where N is an integer greater than or equal to one, comprising:

an angular position transducer including output windings in which three-phase voltages with amplitude variations of N cycles per revolution are induced, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

an inverter for outputting three-phase currents for feeding the motor;

a demodulator for demodulating the three-phase output voltages of the angular position transducer;

a speed detector for determining an actual speed and rotating direction and for determining a speed deviation which is the difference between the actual speed and a target speed;

a PI controller for providing a current amplitude instruction signal based on the speed deviation; and three multipliers for respectively multiplying the voltage output by the PI controller by the three-phase output voltages of the demodulator for generating three-phase current instructions for inputting to a current control circuit of the inverter.

2. An apparatus as recited in claim 1, further comprising a phase changeover circuit disposed between the demodulator and the three multipliers for producing a reverse torque in the motor by changing the phase of the three-phase output of the demodulator.

3. An apparatus as recited in claim 2, further comprising phase shifters disposed between the phase changeover circuit and the three multipliers.

4. An apparatus as recited in claim 1, further comprising phase shifters disposed between the demodulator and the three multipliers.

5. An apparatus as recited in claim 2, further comprising an absolute value circuit disposed between the PI controller and the three multipliers.

6. An apparatus as recited in claim 3, further comprising an absolute value circuit disposed between the PI controller and the three multipliers.

7. An apparatus for controlling a synchronous motor having 2N poles, where N is an integer greater than or equal to one, comprising:

an angular position transducer including output windings in which two of three-phase voltages with amplitude variations of N cycles per revolution are induced, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

an inverter for outputting three-phase currents for feeding the motor;

a demodulator for demodulating the two of three-phase output voltages of the angular position transducer;

a speed detector for determining an actual speed and for determining a speed deviation which is the difference between the actual speed and a target speed;

a PI controller for providing a current amplitude instruction signal based on the speed deviation;

two multipliers for respectively multiplying the voltage output by the PI controller by the two of three-phase output voltages of the demodulator for generating two of three-phase current instructions for inputting to a current control circuit of the inverter; and an adder for adding the outputs of the two multipliers to generate a third of the three-phase current instructions for inputting to the current control circuit of the inverter.

8. A method of controlling a synchronous motor having 2N poles, where N is an integer greater than or equal to one, comprising:

inducing three-phase voltages with amplitude variations of N cycles per revolution in output windings of an angular position transducer, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

outputting three-phase currents for feeding the motor from an inverter;

demodulating the three-phase output voltages of the angular position transducer with a demodulator;

determining an actual speed and rotating direction and determining a speed deviation which is the difference between the actual speed and a target speed with a speed detector;

providing a current amplitude instruction signal based on the speed deviation with a PI controller; and respectively multiplying the voltage output by the PI controller by the three-phase output voltage of the demodulator and generating three-phase current instructions for inputting to a current control circuit of the inverter using three multipliers.

9. A method as recited in claim 8, further comprising producing a reverse torque in the motor by changing the phase of the three-phase output of the demodulator using a phase changeover circuit disposed between the demodulator and the three multipliers.

10. A method as recited in claim 9, further comprising shifting the phase of the output of the phase changeover circuit using phase shifters disposed between the phase changeover circuit and the three multipliers.

11. A method as recited in claim 8, further comprising shifting the phase of the output of the demodulator using phase shifters disposed between the demodulator and the three multipliers.

12. A method as recited in claim 9, further comprising taking an absolute value of an output from the PI controller using an absolute value circuit disposed between the PI controller and the three multipliers.

13. A method as recited in claim 10, further comprising taking an absolute value of an output from the PI controller using an absolute value circuit disposed between the PI controller and the three multipliers.

14. A method of controlling a synchronous motor having 2N poles, where N is an integer greater than or equal to one, comprising:

inducing three-phase voltages with amplitude variations of N cycles per revolution in two of three output windings of an angular position transducer, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

outputting three-phase currents for feeding the motor from an inverter;

demodulating the two of three-phase output voltages of the angular position transducer with a demodulator;

determining an actual speed and determining a speed deviation which is the difference between the actual speed and a target speed with a speed detector;

providing a current amplitude instruction signal based on the speed deviation with a PI controller;

respectively multiplying the voltage output by the PI controller by the two of three-phase output voltage of the demodulator and generating two of three-phase current instructions for inputting to a current control circuit of the inverter using two multipliers; and adding the outputs of the two multipliers to generate a third of the three-phase current instructions for inputting to the current control circuit of the inverter using an adder.

15. An apparatus for controlling a synchronous motor having 2N poles, where N is an integer greater than or equal to one, comprising:

an angular position transducer including output windings in which three-phase voltages with amplitude variations of N cycles per revolution are induced, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

an inverter for outputting three-phase currents for feeding the motor;

a demodulator for demodulating the three-phase output voltages of the angular position transducer;

a speed detector for determining an actual speed for display or system control;

a calculating circuit for providing a current amplitude instruction signal based on a given torque instruction;

three multipliers for respectively multiplying the output voltage from the calculating circuit by the three-phase output voltages of the demodulator for generating three-phase current instructions for inputting to a current control circuit of the inverter.

16. An apparatus as recited in claim 15, further comprising a phase changeover circuit disposed between the demodulator and the three multipliers for producing a reverse torque in the motor by changing the phase of the three-phase output of the demodulator.

17. An apparatus as recited claim 15, further comprising phase shifters disposed between the demodulator and three multipliers.

18. An apparatus as recited claim 16, further comprising phase shifters disposed between the phase changeover circuit and the three multipliers.

19. An apparatus for controlling a synchronous motor having 2N poles, where N is an integer greater than or equal to one, comprising:

an angular position transducer including output in which windings three-phase voltages with amplitude variations of N cycles per revolution are induced, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

an inverter for outputting three-phase currents for feeding the motor;

a demodulator for demodulating the three-phase output voltages of the angular position transducer;

a speed detector for determining an actual speed for display or system control;

an electrical circuit for providing a current amplitude instruction signal corresponding to a position of a mechanical operational part;

a circuit for giving a positive or negative sign for the current amplitude instruction signal corresponding to a forward or reverse direction of torque given as an instruction;

three multipliers for respectively multiply the output voltage from the calculating circuit by the three, phase output voltage of the demodulator for generating three-phase current instruction for inputting to a current control circuit of the inverter.

20. An apparatus as recited claim 19, further comprising phase shifters disposed between the demodulator and three multipliers.

21. An apparatus for controlling a synchronous motor having 2N poles, where N is an integer greater than or equal to one, comprising:

an angular position transducer including output windings in which three-phase voltages with amplitude variations of N cycles per revolution are induced, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

an inverter for outputting three-phase currents for feeding the motor;

a demodulator for demodulating the three-phase output voltages of the angular position transducer;

a phase changeover circuit disposed between the demodulator and three multipliers for producing a reverse torque in the motor by changing the phase of the three-phase output of the demodulator;

a speed detector for determining an actual speed for display or system control;

an electrical circuit for providing a current amplitude instruction signing corresponding to a position of a mechanical operational part;

a circuit for providing a positive or negative voltage corresponding to a forward or reverse direction of torque given as an instruction;

three multipliers for respectively multiplying the output voltage from the calculating circuit by the three-phase output voltages of the demodulator for generating three-phase current instructions for inputting to a current control circuit of the inverter.

22. An apparatus as recited claim 21, further comprising phase shifters disposed between the phase changeover circuit and the three multipliers.

23. An method of controlling a synchronous motor having 2N poles, where N is an integer greater than or equal to one, comprising:

inducing three-phase voltages with amplitude variations of N cycles per revolution in output windings of an angular position transducer, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

outputting three-phase currents for feeding the motor from an inverter;

demodulating the three-phase output voltages of the angular position transducer with a demodulator;

determining an actual speed with a speed detector for display or system control;

providing a current amplitude instruction signal based on a given torque instruction with a calculating circuit;

respectively multiplying the output voltage from the calculating circuit by the three-phase output voltages of the demodulator for generating three-phase current instructions for inputting to a current control circuit of the inverter using three multipliers.

24. A method as recited in claim 23, further comprising producing a reverse torque in the motor by changing the phase of the three-phase output of the demodulator using a phase changeover circuit disposed between the demodulator and the three multipliers.

25. A method as recited in claim 23, further comprising shifting the phase of the output of the demodulator using phase shifters disposed between the demodulator and the three multipliers.

26. A method as recited in claim 24, further comprising shifting the phase of the output of the demodulator using phase shifters disposed between the phase changeover circuit and the three multipliers.

27. An method of controlling a synchronous motor having 2N poles, where N is an integer greater than or equal to one, comprising:

inducing three-phase voltages with amplitude variations of N cycles per revolution in output windings of an angular position transducer, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

outputting three-phase currents for feeding the motor from an inverter;

demodulating the three-phase output voltages of the angular position transducer with a demodulator;

determining an actual speed with a speed detector for display or system control;

providing a current amplitude instruction signal corresponding to the position of a mechanical operational part, with an electrical circuit;

providing positive or negative sign for the current amplitude instruction signal corresponding to forward or reverse direction of torque given as an instruction with a circuit;

respectively multiplying the output voltage from the calculating circuit by the three-phase output voltages of the demodulator for generating three-phase current instructions for inputting to a current control circuit of the inverter using three multipliers.

28. A method as recited in claim 27, further comprising shifting the phase of the output of the demodulator using phase shifters disposed between the demodulator and the three multipliers.

29. A method of controlling a synchronous motor having 2N poles, where N is an integer greater than or equal to one, comprising:

inducing three-phase voltages with amplitude variations of N cycles per revolution in output windings of an angular position transducer, the angular position transducer being mechanically directly coupled to the motor so that a demodulated a-phase voltage of the transducer has its positive peak value multiplied by a cosine of a predetermined MMF phase angle when a direct axis of the motor is located in a position of its a-phase winding axis;

outputting three-phase currents for feeding the motor from an inverter;

demodulating the three-phase output voltages of the angular position transducer with a demodulator;

producing a reverse torque in the motor by changing the phase of the three-phase output of the demodulator using a phase changeover circuit disposed between the demodulator and the three multipliers;

determining an actual speed with a speed detector for display or system control;

providing a current amplitude instruction signal corresponding to the position of a mechanical operational part; with an electrical circuit;

providing a positive or negative voltage corresponding to a forward or reverse direction of torque given as an instruction;

respectively multiplying the output voltage from the calculating circuit by the three-phase output voltages of the demodulator for generating three-phase current instructions for inputting to a current control circuit of the inverter using three multipliers.

30. A method as recited in claim 29, further comprising shifting the phase of the output of the demodulator using phase shifters disposed between the phase changeover circuit and the three muiltipliers.

* * * * *